United States Patent
Nakatani et al.

(10) Patent No.: US 12,043,039 B2
(45) Date of Patent: Jul. 23, 2024

(54) IMAGE PROCESSING APPARATUS, IMAGE PROCESSING METHOD, AND STORAGE MEDIUM THAT GENERATE A CHART IMAGE HAVING A PLURLAITY OF PATCHES WITH DIFFERENT TONE VALUES

(71) Applicant: CANON KABUSHIKI KAISHA, Tokyo (JP)

(72) Inventors: Yuki Nakatani, Chiba (JP); Hisashi Ishikawa, Chiba (JP); Naoya Takesue, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 17/518,864

(22) Filed: Nov. 4, 2021

(65) Prior Publication Data
US 2022/0161569 A1    May 26, 2022

(30) Foreign Application Priority Data
Nov. 20, 2020    (JP) ................................. 2020-193305

(51) Int. Cl.
    *B41J 29/393*    (2006.01)
    *B41J 2/045*     (2006.01)
    *B41J 2/21*      (2006.01)

(52) U.S. Cl.
    CPC ......... *B41J 2/2146* (2013.01); *B41J 2/04535* (2013.01); *B41J 2/04541* (2013.01); *B41J 2/04558* (2013.01)

(58) Field of Classification Search
    None
    See application file for complete search history.

(56) References Cited

FOREIGN PATENT DOCUMENTS

| JP | 2014027649 A | * | 2/2014 |
| JP | 2014-100854 A | | 6/2014 |
| JP | 2014150515 A | * | 8/2014 |

OTHER PUBLICATIONS

Hodoshima, MachineTranslationofJP-2014150515-A, 2014 (Year: 2014).*
Hodoshima, MachineTranslationofJP-2014027649-A, 2014 (Year: 2014).*

* cited by examiner

*Primary Examiner* — Scott A Richmond
(74) *Attorney, Agent, or Firm* — Venable LLP

(57) ABSTRACT

An image processing apparatus includes a generation unit generating a first chart image having a plurality of patches with different tone values, an obtaining unit obtaining measurement values acquired by measuring a test chart created by forming the first chart image on a medium, the measurement values indicating densities of a color material in regions of the test chart corresponding to the respective patches, and a selection unit selecting at least one tone value in a range in which an output characteristic of the image forming apparatus derived based on the tone values of the respective patches and the measurement values satisfies a predetermined condition. The generation unit generates a second chart image having a patch corresponding to the selected tone value included and at least one patch corresponding to the tone value outside the range in which the output characteristic satisfies the predetermined condition is omitted among the patches.

15 Claims, 16 Drawing Sheets

IMAGE PROCESSING APPARATUS, IMAGE PROCESSING METHOD, AND STORAGE MEDIUM THAT GENERATE A CHART IMAGE HAVING A PLURLAITY OF PATCHES WITH DIFFERENT TONE VALUES

BACKGROUND OF THE INVENTION

Cross Reference to Priority Application

This application claims the benefit of Japanese Patent Application No. 2020-193305 filed Nov. 20, 2020, which is hereby incorporated by reference herein in its entirety.

Field of the Invention

The present disclosure relates to image processing for reducing density nonuniformity in an image.

Description of the Related Art

An inkjet printing apparatus that moves a print head in which multiple ink ejection ports (nozzles) are arranged and a print medium relative to each other and ejects ink droplets (dots) from the nozzles to form a desired image on the print medium has been conventionally widely used as an image forming apparatus. In such an inkjet printing apparatus, variation in ejection characteristics (output characteristics) of the multiple nozzles causes density nonuniformity (non-uniform density) and streak nonuniformities in a printed image and such nonuniformity is problematic in terms of image quality in some cases. Note that the density nonuniformity may similarly be problematic in terms of image quality also in an electrophotographic image forming apparatus.

For reducing such density nonuniformity and streak nonuniformities, there is known a technique in which a test chart for density measurement is outputted and measured to obtain nonuniformity correction values for the respective nozzles and input image data is corrected by using the obtained nonuniformity correction values. Japanese Patent Laid-Open No. 2014-100854 discloses a method in which multiple types of test charts having tone values set in advance or tone values manually set by a user are outputted and measured to create highly-accurate density nonuniformity correction values without an increase in the number of tone values in each of the test charts. In this method, in a case when a user desires to make tone intervals smaller and to perform fine tone measurement for highly-accurate density nonuniformity correction, the tone intervals between patches can be made smaller by increasing the types of test charts to be outputted.

However, in the method of Japanese Patent Laid-Open No. 2014-100854, in order to make the tone intervals between patches smaller, it is necessary to increase the types of test charts to be outputted and to increase the number of patches. Accordingly, this method has a problem of an increase in the number of test charts to be outputted.

An object of the present disclosure is to provide processing for performing highly-accurate density nonuniformity correction while saving the number of patches.

SUMMARY OF THE INVENTION

In order to solve the aforementioned problem, the image processing apparatus according to the present disclosure includes a generation unit that generates a first chart image in which a plurality of patches with different tone values are arranged, an obtaining unit that obtains measurement values acquired by performing measurement on a test chart created by forming the first chart image on a print medium with an image forming apparatus, the measurement values indicating densities of a color material in regions of the test chart corresponding to the respective patches, and a selection unit that selects at least one tone value in a range in which an output characteristic of the image forming apparatus derived based on the tone values of the respective patches and the measurement values satisfies a predetermined condition, wherein the generation unit generates a second chart image in which a patch corresponding to the selected at least one tone value is included and at least one patch corresponding to the tone value outside the range in which the output characteristic satisfies the predetermined condition is omitted among the plurality of patches.

Further features of the present invention will become apparent from the following description of exemplary embodiments with reference to the attached drawings.

DESCRIPTION OF THE EMBODIMENTS

Embodiments of the present disclosure are described below with reference to the attached drawings. Note that configurations illustrated in the following embodiments are merely examples and the present disclosure is not limited to the illustrated configurations.

First Embodiment

<Hardware Configuration of Image Processing Apparatus>

Figure 16:
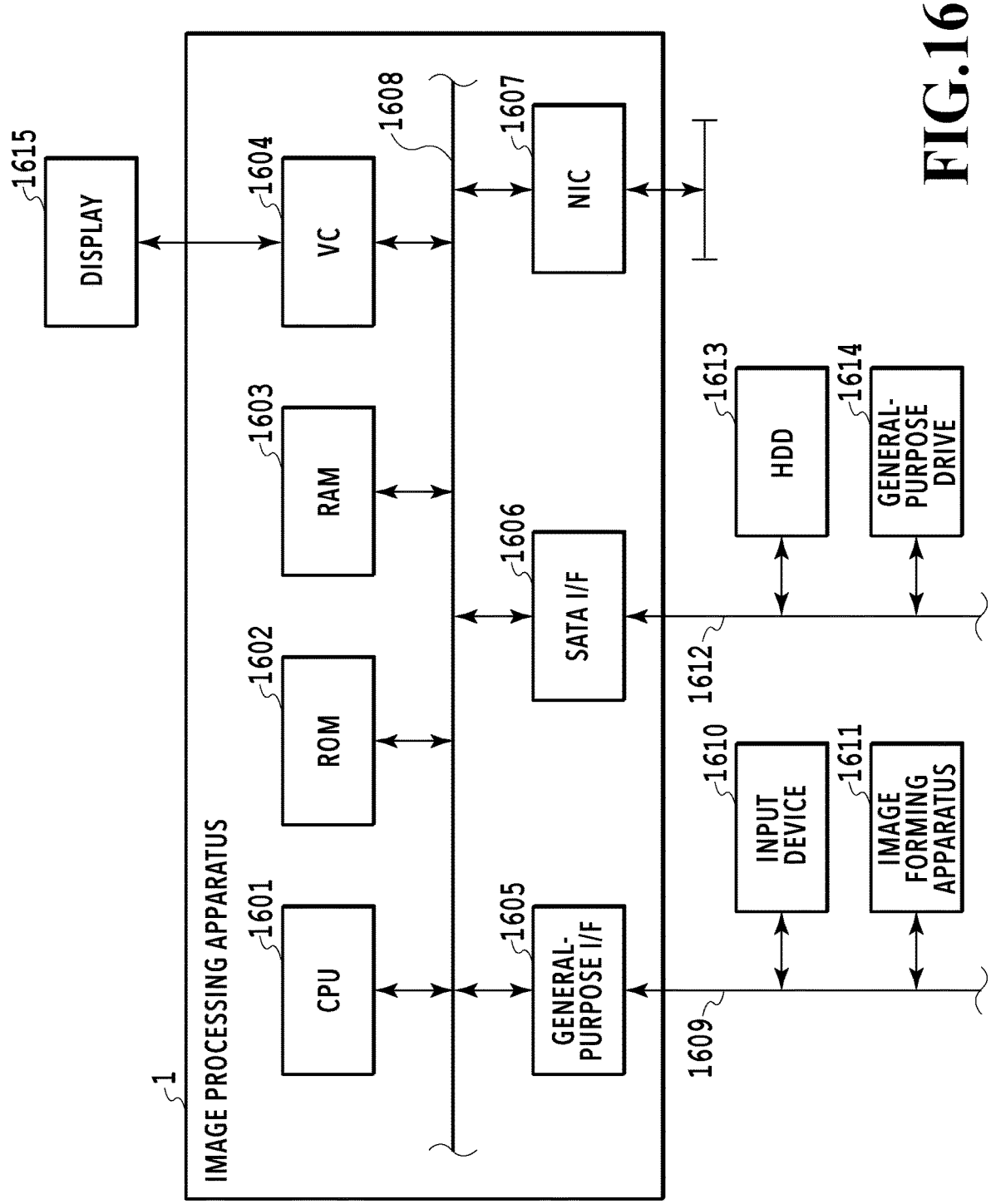
FIG. 16 is a block diagram illustrating a hardware configuration of the image processing apparatus.

FIG. 16 is a block diagram illustrating a hardware configuration of an image processing apparatus 1. The image processing apparatus 1 includes a central processing unit (CPU) 1601, a read-only memory (ROM) 1602, and a random access memory (RAM) 1603. Moreover, the image processing apparatus 1 includes a video card (VC) 1604, a general-purpose interface (I/F) 1605, a serial ATA (SATA) I/F 1606, and a network interface card (NIC) 1607. The CPU 1601 executes an operating system (OS) and various programs stored in the ROM 1602, a hard disk drive (HDD) 1613, and the like, while using the RAM 1603 as a work memory. Moreover, the CPU 1601 controls various configurations via a system bus 1608. Note that the CPU 1601 loads program codes stored in the ROM 1602, the HDD 1613, and the like, on the RAM 1603 to execute processing of flowcharts to be described later. A display 1615 is connected to the VC 1604. An input device 1610, such as a mouse and a keyboard, and an image forming apparatus 1611 are connected to the general-purpose I/F 1605 via a serial bus 1609. The HDD 1613 and a general-purpose drive 1614 that reads data from and writes data to various types of recording media are connected to the SATA I/F 1606 via a serial bus 1612. The NIC 1607 exchanges information with an external apparatus.

The CPU 1601 uses the HDD 1613 and the various types of recording media mounted on the general-purpose drive 1614 as storage locations of various pieces of data. The CPU 1601 displays a graphical user interface (GUI) provided by a program on the display 1615 and receives inputs such as user instructions received via the input device 1610.

Although the image forming apparatus 1611 is a single-pass type inkjet printer, the image forming apparatus 1611 may be an electrophotographic image forming apparatus. Although the image forming apparatus 1611 in the embodiment is connected to the image processing apparatus 1 via the serial bus 1609, the image forming apparatus 1611 may have a configuration including the image processing apparatus 1 as an image processing unit.

<Functional Configuration of Image Processing Apparatus>

Figure 1:
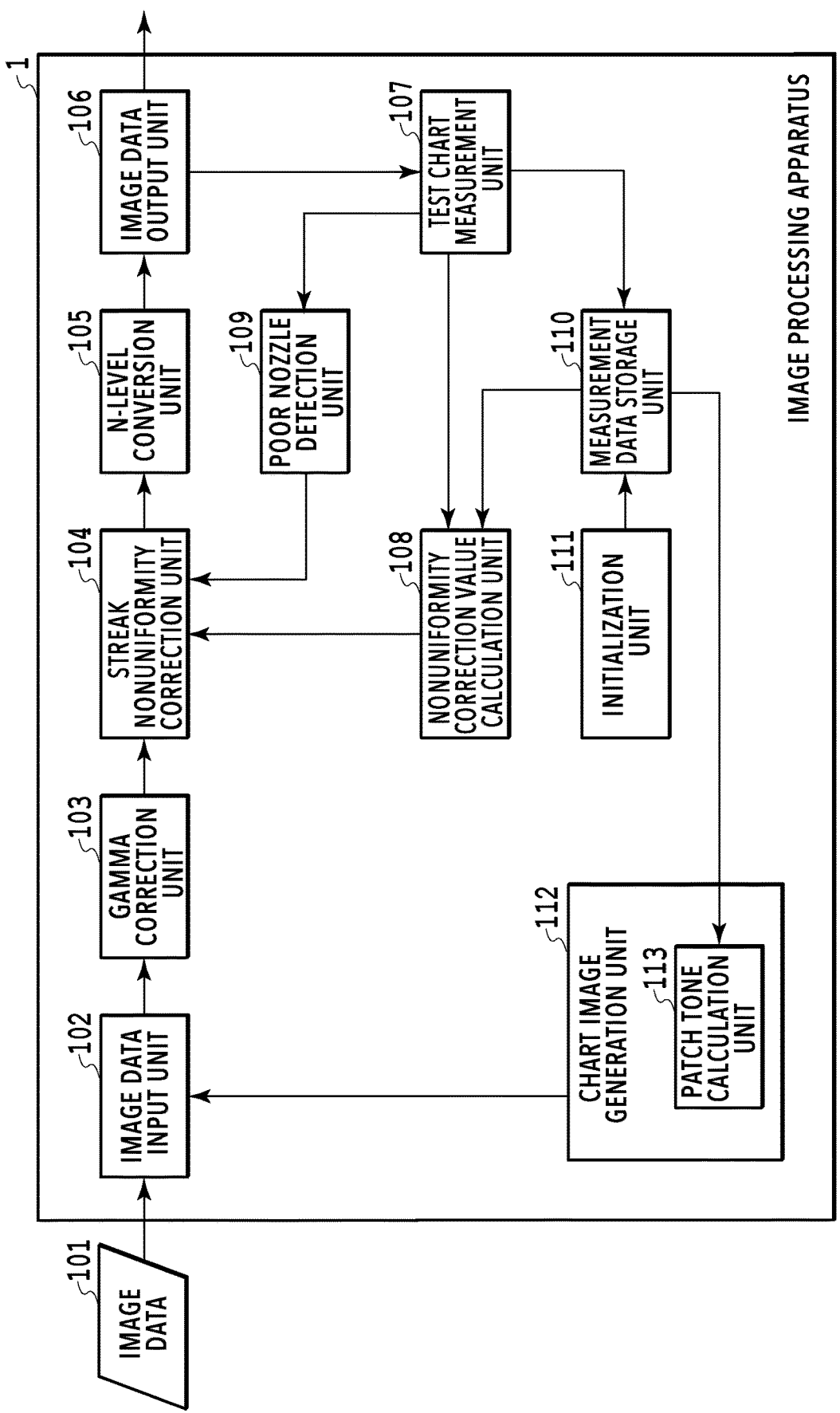
FIG. 1 is a block diagram illustrating a functional configuration example of an image processing apparatus.

FIG. 1 is a block diagram illustrating a functional configuration example of the image processing apparatus in the embodiment. The image processing apparatus 1 processes input image data 101 received from the outside and sends the processed input image data 101 to the image forming apparatus 1611, including an inkjet (IJ) head, in which multiple ink ejection ports (nozzles) are arranged. The image processing apparatus 1 includes an image data input unit 102, a gamma correction unit 103, a streak nonuniformity correction unit 104, an N-level conversion unit 105, an image data output unit 106, a test chart measurement unit 107, and an nonuniformity correction value calculation unit 108. The image processing apparatus 1 also includes a poor nozzle detection unit 109, a measurement data storage unit 110, an initialization unit 111, and a chart image generation unit 112. Furthermore, the chart image generation unit 112 includes a patch tone calculation unit 113.

The image data input unit 102 functions as an image obtaining unit for acquiring the image data to be printed. The image data input unit 102 may be a data input terminal that acquires the input image data 101 to be printed from a not-illustrated PC, or the like, a wireless or a wired communication interface unit, a media interface unit that reads and writes data from and to a storage medium such as a memory card, or the like. Note that, in a case when the IJ head included in the image forming apparatus 1611 uses, for example, inks of black (K), cyan (C), magenta (M), and yellow (Y), the input image data 101 is image data formed of 8-bit color signals for K, C, M, and Y, respectively.

The gamma correction unit 103 functions as a tone conversion processing unit for converting the input image data 101 received from the image data input unit 102 into a desired tone by performing gamma correction processing. The gamma correction unit 103 performs tone value correction by using a one-dimensional look-up table (LUT) for each of the colors (K, C, M, and Y) prepared in advance.

The streak nonuniformity correction unit 104 performs image processing for suppressing density nonuniformities and streak nonuniformities caused by a poor nozzle and variation in ejection characteristics among the nozzles included in the IJ head. Specifically, a one-dimensional correction LUT for correcting streak nonuniformities is prepared for each nozzle position and streak nonuniformity correction processing is achieved by performing tone conversion while using this one-dimensional correction LUT. The N-level conversion unit 105 converts image data of a multi-level tone (M levels) to image data of N levels (N is an integer of two or more and less than M) printable in the IJ head by using a known N-level conversion method such as an error diffusion method and a dither method.

The image data output unit 106 converts the image data of N levels generated by the N-level conversion unit 105 according to nozzle arrangement and outputs the converted image data to an IJ head driver of the image forming apparatus 1611.

The chart image generation unit 112 is a processing unit for generating a chart image for nonuniformity correction and includes the patch tone calculation unit 113. In this case, the chart image is image data in which multiple rectangular patches each elongating in a nozzle row direction of the inkjet head and each having a uniform tone value on data are arranged.

The patch tone calculation unit 113 is a calculation unit that newly determines selected tone values to be used in the chart image, based on measurement data stored in the measurement data storage unit 110 to be described later. The test chart measurement unit 107 measures a output result of the test chart formed by the IJ head and obtains an output characteristic of each nozzle based on the measurement result. In this case, the output characteristic is an output characteristic in which the density of a color material outputted onto a sheet surface is associated with each input tone value. The color material is ink in a case when the image forming apparatus is an inkjet image forming apparatus as in the embodiment, and is toner in a case when the image forming apparatus is an electrophotographic image forming apparatus.

Note that the measurement result only needs to be data from which the output characteristic of each nozzle can be obtained and is, for example, a scanned image captured by a not-illustrated inline scanner incorporated in the inkjet printing apparatus or an offline scanner prepared separately. Another type of the measurement result may be density data directly obtained by a microdensitometer, or the like. In the following description, the test chart measurement unit 107 is assumed to obtain the output characteristic of each nozzle based on the density estimated from a luminance value of a scanned image captured by a not-illustrated inline scanner.

The nonuniformity correction value calculation unit 108 is a calculation unit that calculates a nonuniformity correction value for each nozzle based on the output characteristic obtained by the test chart measurement unit 107. Note that the calculated correction value is sent to the streak nonuniformity correction unit 104 together with position information of the corresponding nozzle in the form of the one-dimensional correction LUT in which the correction value is associated with the input tone value.

The poor nozzle detection unit 109 is a processing unit that determines the position of the poor nozzle in which ejection failure, landing position misalignment, or the like, is occurring, based on the output characteristic obtained by the test chart measurement unit 107.

The measurement data storage unit 110 is a storage unit that stores the output characteristic obtained by the test chart measurement unit 107. The measurement data storage unit 110 stores the output characteristic in which the input tone value of the test chart and the measurement value of the density of the ink outputted based on the input tone value for each nozzle are associated with each other. Details are to be described later.

The initialization unit 111 includes a user interface that allows a user to initialize past data as necessary. For example, in a case when the user presses an initialization button, the selected tone values and the measurement values saved in the measurement data storage unit 110 are deleted.

<Work Flow of Dynamic Correction>

Figure 2:
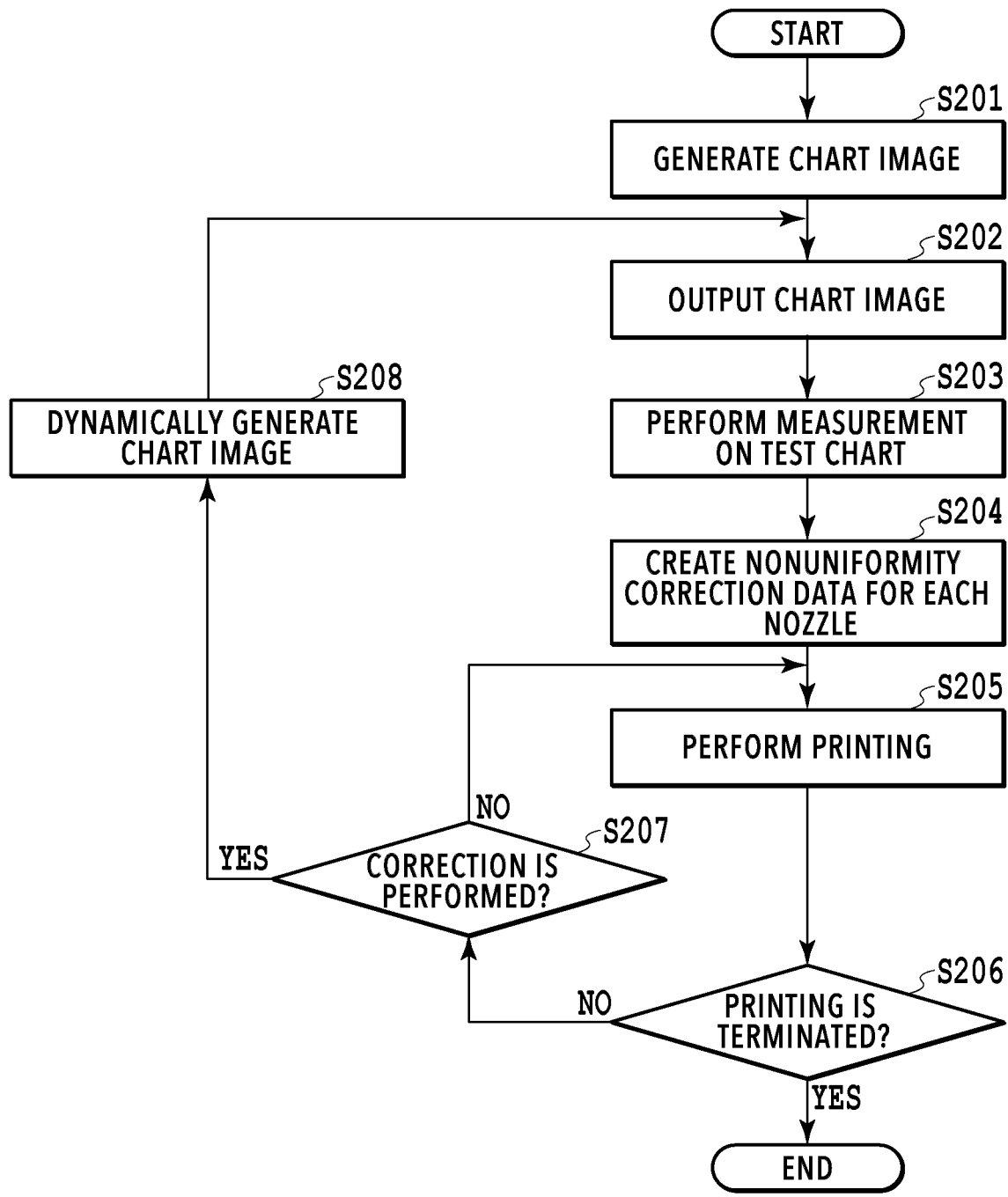
FIG. 2 is a flowchart illustrating a procedure of streak nonuniformity correction processing.

In the embodiment, the input tone values of the test chart obtained from a second or a later output operation are updated by using the selected tone values dynamically selected based on the measurement results in the latest test chart and this enables generation of a test chart that can improve accuracy of nonuniformity correction. FIG. 2 is a flowchart illustrating a procedure of the streak nonuniformity correction processing executed by the image processing apparatus of the embodiment. The steps in the flow illustrated in FIG. 2 are described below.

Figure 3:
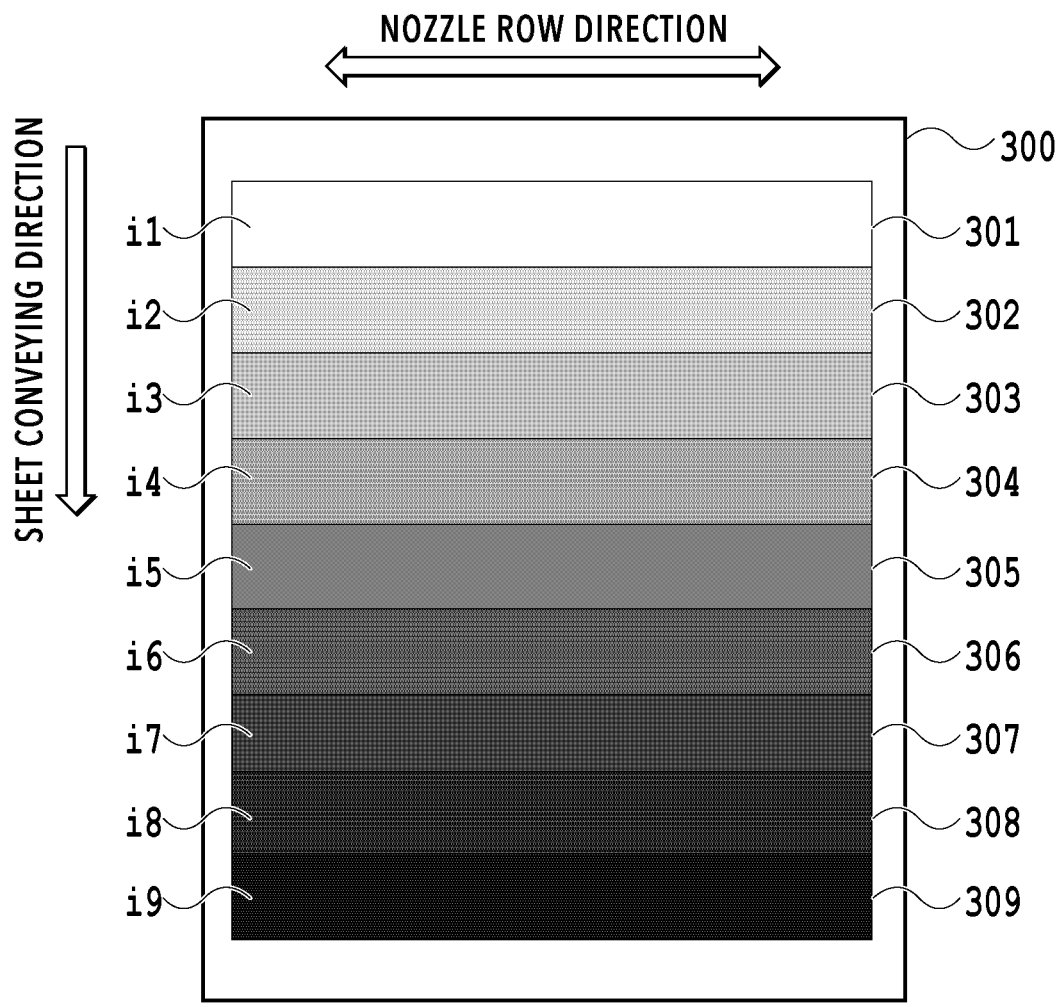
FIG. 3 is a view illustrating an example of a chart image.

In S201, the chart image generation unit 112 generates the chart image. An example of the chart image generated herein is illustrated in FIG. 3. In a chart image 300 illustrated in FIG. 3, nine tone value patches 301 to 309 whose input tone values are set to i1 to i9, respectively, are arranged. The number and the arrangement order of the tone value patches are not limited to those illustrated herein. In the generation of the chart image in S201, initial tone values set in advance are used as the input tone values i1 to i9. As the initial tone values, it is preferable to use values obtained by dividing a definition region (for example, 0 to 255 in the case of 8 bits) of the input tone values of the image data at appropriate intervals.

In S202, the chart image generation unit 112 outputs the generated chart image to the image data input unit 102. The chart image generated in S201 is converted into tone data using the one-dimensional gamma correction LUT by the gamma correction unit 103, is converted into N-level data by the N-level conversion unit 105, is sent from the image data output unit 106 to the IJ head via the IJ head driver, and is outputted to a not-illustrated print medium as an image by the IJ head. Note that the chart image is not corrected by the streak nonuniformity correction unit 104.

In S203, the test chart measurement unit 107 measures the test chart outputted onto the print medium and measures the output characteristic of each nozzle. For example, the test chart measurement unit 107 cuts out, from an image obtained by the inline scanner, or the like, rectangular portions for the respective tone value patches 301 to 309 of the chart image 300 by performing image processing. Then, the test chart measurement unit 107 calculates an average of pixel values in a sheet conveyance direction in each of the cut-out rectangular portions, thereby obtaining an individual nozzle output characteristic. The test chart measurement unit 107 stores the obtained individual nozzle output characteristic in the measurement data storage unit 110 as the measurement data.

Figure 4:
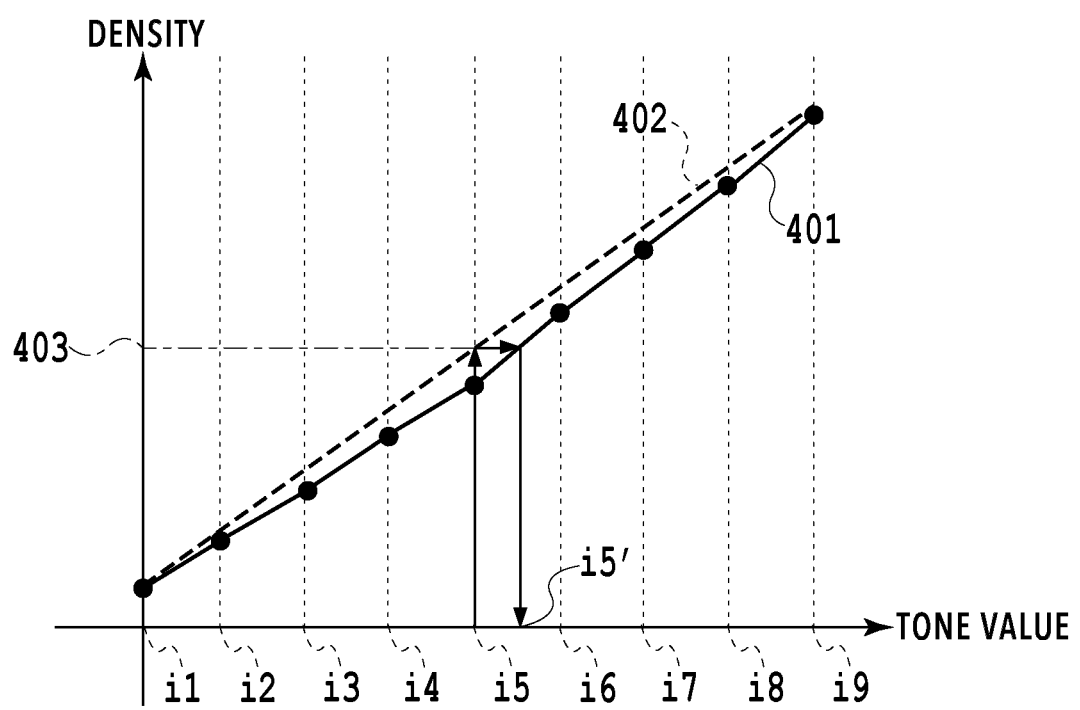
FIG. 4 is a diagram illustrating an output characteristic of an image forming apparatus.

In S204, the nonuniformity correction value calculation unit 108 calculates the nonuniformity correction value for each nozzle position based on the measurement result of S203. FIG. 4 is a graph of an individual nozzle output characteristic 401 that is the output characteristic of each nozzle obtained in S203 and a target output characteristic (target characteristic) 402. The target characteristic herein is a target characteristic determined in advance depending on the output characteristic of each nozzle. In the embodiment, the target characteristics are set to density values having a linear relationship with the input tone values, as illustrated in FIG. 4. In this case, the nonuniformity correction value calculation unit 108 obtains a target density value 403 corresponding to a certain input tone value, for example, the input tone value i5 from the target characteristic and obtains an input tone value in the individual nozzle output characteristic 401 corresponding to the target density value 403, as a corrected input tone value i5'. The nonuniformity correction value calculation unit 108 obtains the corrected input tone value for each input tone value as described above and creates the one-dimensional correction LUT in which the input tone values and the corrected input tone values are associated with one another.

The processing in S201 to S204 described above enables creation of nonuniformity correction data for printing any image. In this processing, for example, in the inkjet printer using inks of four colors of C, M, Y, and K, the processing described in S201 to S204 is performed for these colors in parallel or in series, and the nonuniformity correction data corresponding each of C, M, Y, and K is created. In this case, the initial tone values may be set to values different among the colors.

Note that the processing in S201 to S204 is executed in start-up of the apparatus, attachment of the head, paper replacement, or the like, before a user makes image printing.

In S205, the image processing apparatus 1 outputs an image in response to an image print instruction from the user. In the embodiment, the print instruction from the user is assumed to be input of the input image data 101 to be printed into the image data input unit 102. The input image data 101 sent via the image data input unit 102 is subjected to the gamma correction processing by the gamma correction unit 103 and is sent to the streak nonuniformity correction unit 104. The streak nonuniformity correction unit 104 performs the streak nonuniformity correction processing by using the one-dimensional correction LUT for each nozzle position created in S204. Thereafter, the input image data 101 is converted into N-level data by the N-level conversion unit 105, is sent from the image data output unit 106 to the IJ head via the IJ head driver, and is outputted as an image by the IJ head.

In S206, the image processing apparatus 1 determines whether to terminate the printing. If the printing is completed for the number of sheets to be printed instructed together with the input image data 101, the image processing apparatus 1 terminates the printing. If the image processing apparatus 1 determines to continue the printing in S206 or to continue printing for another print instruction given from the user after the termination of printing, the image processing apparatus 1 proceeds to S207.

In S207, the image processing apparatus 1 determines whether to recalculate the correction values. Whether to recalculate the correction values may be determined based on a predetermined condition such as whether printing of a predetermined number of sheets is completed or whether a certain or higher degree of streak nonuniformities is determined as remaining, based on an input from an external device such as a sensor for detecting streak nonuniformities. When determining to recalculate the collection values, the image processing apparatus 1 proceeds to S208.

In S208, the chart image generation unit 112 dynamically generates a chart image in which new selected tone values are set as the input tone values i1 to i9 based on the test chart measurement results obtained in previous S203. More specifically, the patch tone calculation unit 113 newly calculates the selected tone values to be used as the input tone values i1 to i9 of the chart image, based on the latest measurement data stored in the measurement data storage unit 110. Thereafter, the chart image generation unit 112 generates the new chart image in which the newly calculated selected tone values are set as the input tone values i1 to i9.

After the generation of the new chart image in S208, the processing in S202 to S204 is executed by using the newly generated chart image to generate nonuniformity correction data for each nozzle again.

In a case when the input tone values of the test chart are dynamically adjusted based on the previous measurement data as described above, an important tone region having a non-monotonic change in the output characteristic can be outputted more intensively and, therefore, higher correction accuracy can be expected than in the case when a test chart having static input tone values is used. Moreover, in some cases, the number of tone values in the dynamically generated test chart may be reduced from the number of initial tone values. In such a case, the correction values can be calculated with fewer output sheets and shorter processing time while maintaining correction accuracy.

Figure 5:
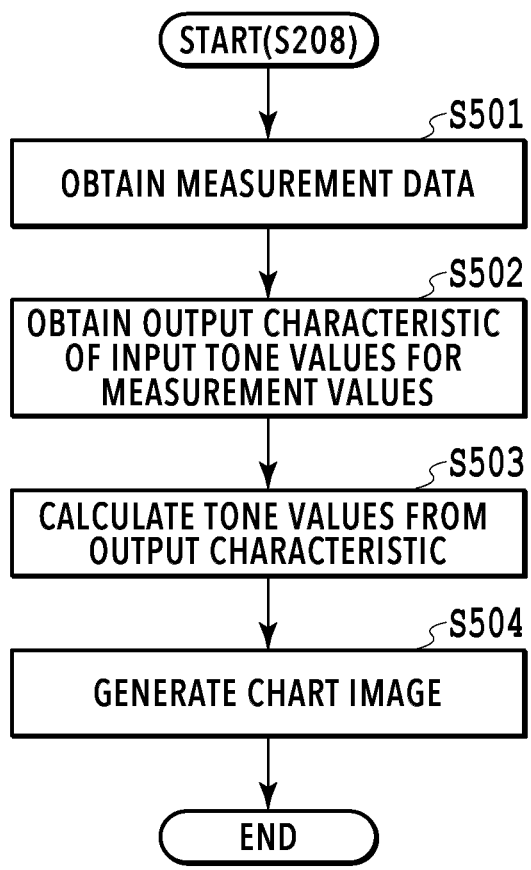
FIG. 5 is a flowchart illustrating a procedure in processing of dynamically generating the chart image for nonuniformity correction.

Details of a procedure of dynamically generating the chart image in S208 are described by using the flowchart of FIG. 5.

<Dynamic Generation of Chart Image>

FIG. 5 is a flowchart illustrating a procedure in processing of dynamically generating the chart image for nonuniformity correction in the chart image generation unit 112 according to the embodiment.

In S501, the chart image generation unit 112 obtains the measurement data of the latest test chart. Specifically, the chart image generation unit 112 obtains, as the measurement data for each nozzle, the output characteristic that is stored in the measurement data storage unit 110 and that indicates the measurement value for each input tone value used in the latest test chart, and sends the output characteristic to the patch tone calculation unit 113. In this case, the measurement value is the density of the ink ejected from each nozzle that is obtained by measuring the test chart as described above.

In S502, the patch tone calculation unit 113 obtains the output characteristic that indicates the measurement value for each input tone value, based on the measurement data obtained in S501. The measurement data includes multiple measurement values for each tone value patch for each nozzle. In this example, for each nozzle, the patch tone calculation unit 113 calculates an average of the measurement values in each tone value patch from the measurement data and obtains the output characteristic of each nozzle by using the calculated average value as the measurement value for the respective input tone values.

Figure 6A:
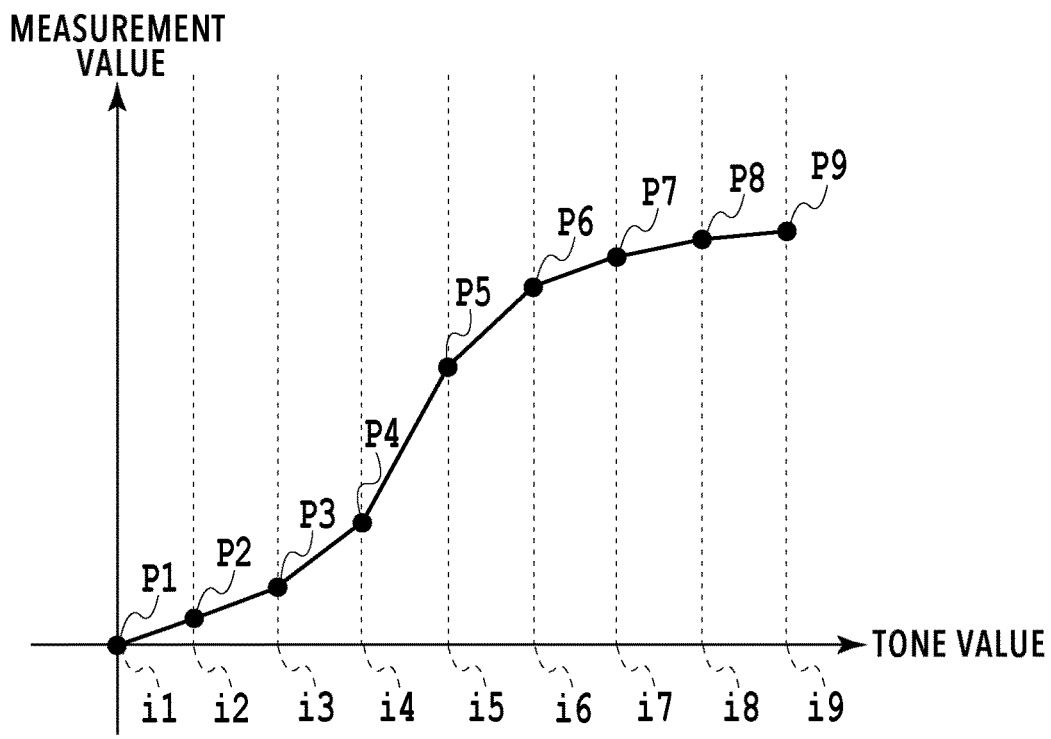
FIG. 6A is a diagram illustrating an example of the output characteristic obtained by using measurement values obtained from patches.

FIG. 6A is an example of the output characteristic obtained in S502. The horizontal axis represents the input tone value and the vertical axis represents the measurement value. Points (sampling points each defined by an input tone value and a measurement value) P1 to P9 plotted in FIG. 6A correspond to the tone value patches 301 to 309 in the chart image 300 illustrated in FIG. 3 and indicate the measurement values for the input tone values i1 to i9, respectively.

Figure 6B:
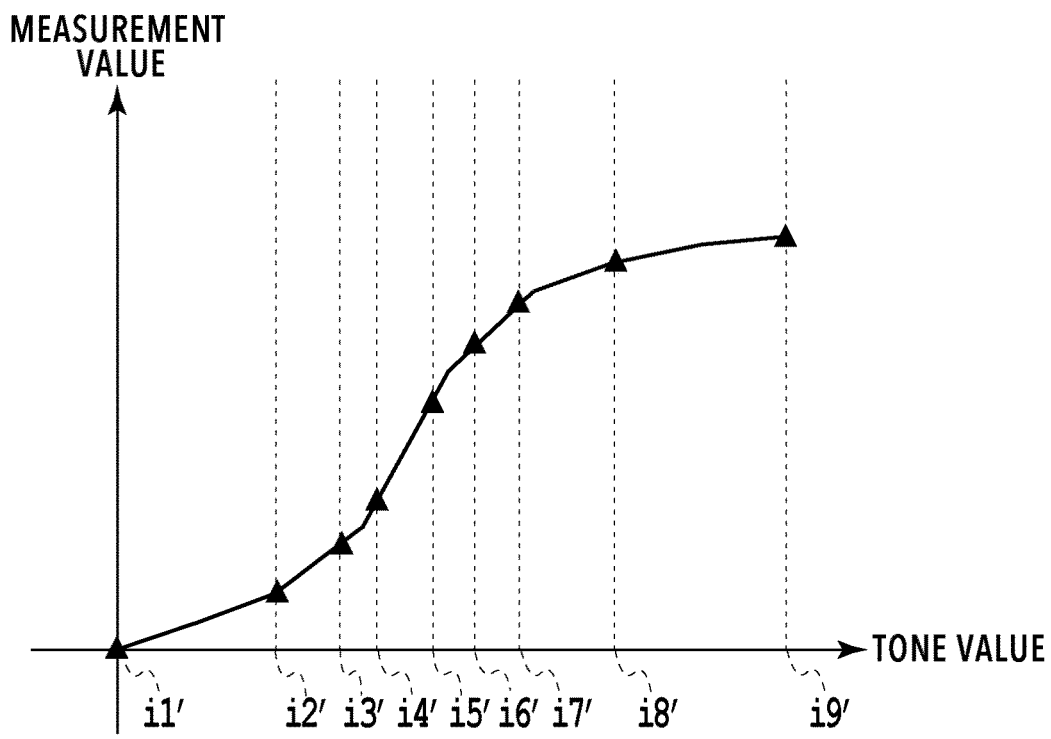
FIG. 6B is a diagram illustrating an example of selected tone values obtained from the output characteristic.

In S503, the patch tone calculation unit 113 calculates the selected tone values to be used as the input tone values of the test chart, from the output characteristic obtained in S502. The selected tone values are selected such that a large number of tone values are selected in a range in which linear interpolation is expected to cause a large interpolation error (large curvature), that is, a range in which a non-linearity index is greater than a predetermined value in the output characteristic of FIG. 6A. In the example illustrated in FIG. 6A, a reduced number of tone values is selected in each of ranges in which the linearity is high, like a range between the input tone values i1 and i3 and a range between the input tone values i7 and i9, and an increased number of input values is selected in a range in which the non-linearity is high, like a range between the input tone values i3 and i7. This allows the measurement to be performed in further detail in a range in which the linear interpolation is expected to have a greater error. FIG. 6B illustrates an example of the output characteristic obtained by replacing some of the initial tone values by the selected tone values. In this example, input tone values i3' to i7' among new input tone values i1' to i9' are the selected tone values employed in place of the initial tone values. Note that the initial tone values used as input tone values i2 and i8 illustrated in FIG. 6A are omitted in FIG. 6B so as to keep the number of input tone values in FIG. 6B unchanged.

Selecting a greater number of input tone values in a range in which the linear interpolation is expected to have a greater error as described above enables highly-accurate calculation of the correction amounts also, even in a case when the output characteristic of the nozzle have non-linear tone values. Meanwhile, reducing the number of input tone values in a range in which the linearity is maintained enables reduction of the number of tone value patches included in the test chart, and processing time for the correction value calculation can be thus reduced. Furthermore, the patch tone calculation unit 113 selects the tone values while predicting the region with high non-linearity based on the actual output result in the embodiment. Therefore, even in a case when an unknown print medium for which the output characteristic is not measured in advance is used, the correction values can be calculated with high accuracy or a short processing time.

In S504, the chart image generation unit 112 generates the chart image by using the selected tone values calculated in S503 as the input tone values and not using at least one initial tone value as the input tone value. A specific generation method is described later.

The aforementioned processing in S501 to S504 allows the image processing apparatus 1 to dynamically generate a test chart from which a more accurate output characteristic can be obtained while performing correction based on the measurement result in each operation.

Figure 7:
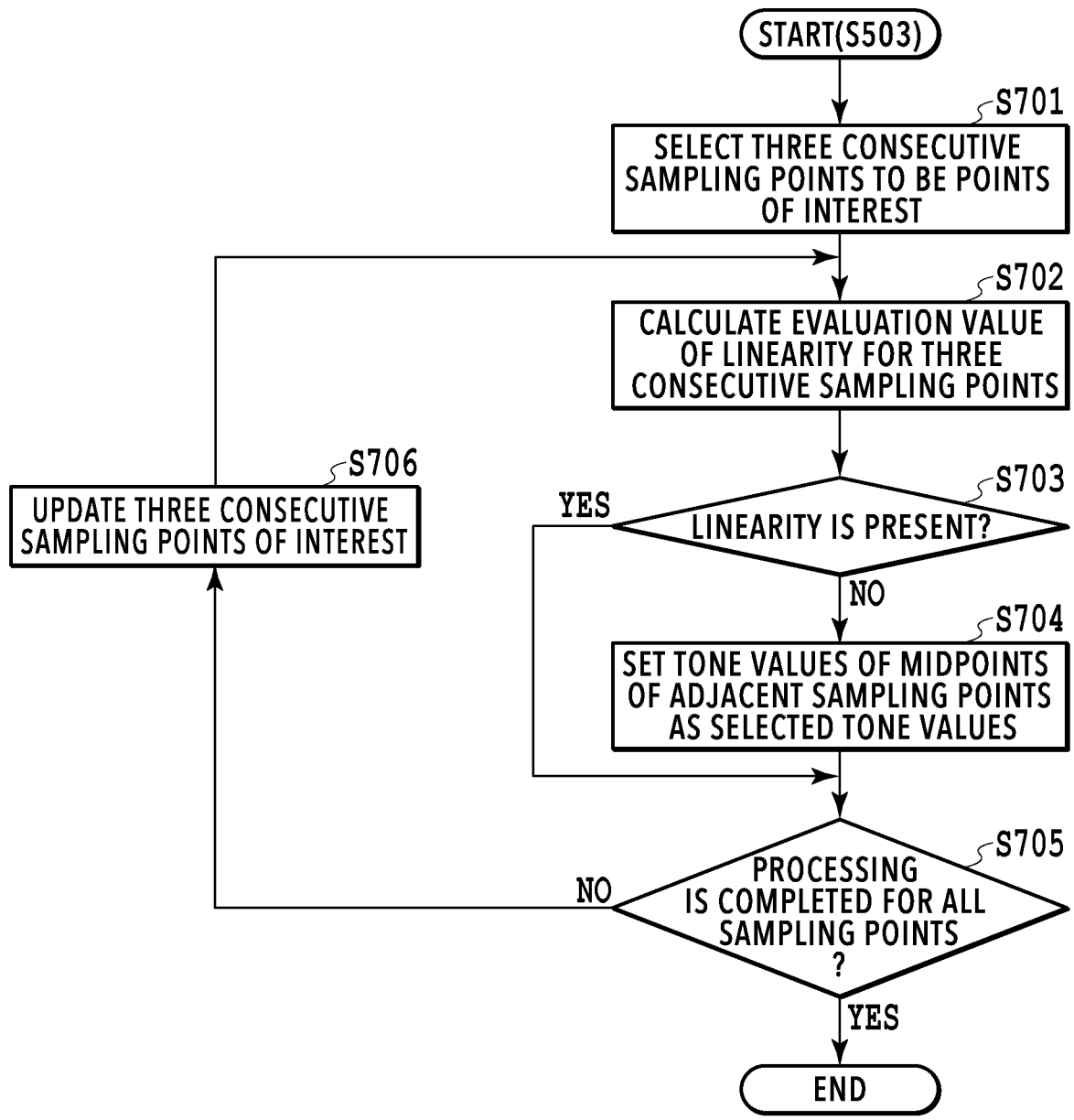
FIG. 7 is a flowchart illustrating a procedure of tone value selection processing according to a first embodiment.

Next, a description is given below of details of the processing of selecting the tone values in S503 in the dynamic generation of the chart image. In the embodiment, the linearity of each set of three consecutive sampling points is evaluated and the selected tone values are selected based on the result of this evaluation. Selecting the selected tone values as described above can increase the number of sampling points in a range in which the linearity of the output characteristic is low. FIG. 7 illustrates a flowchart of tone value selection processing by the patch tone calculation unit 113 in the embodiment.

In S701, the patch tone calculation unit 113 selects one set of three consecutive sampling points. The set of three consecutive sampling points includes three sampling points denoted by Pn−1, Pn, and Pn+1 (n=2, 3, . . . , 8) in FIG. 6A. Although the first set of interest in this step is not limited in particular, this example assumes that a set of P1, P2, and P3 (n=2) is set as the first set of interest and n is updated by being incremented in update processing (S706) to be described later.

In S702, the patch tone calculation unit 113 calculates the evaluation value of the linearity in the set of sampling points selected in S701. Specifically, the patch tone calculation unit 113 obtains a formula of a straight line L passing the two sampling points Pn−1 and Pn+1 at both ends, calculates a distance d between the straight line L and the sampling point Pn, and sets the distance d as the evaluation value. Alternatively, the patch tone calculation unit 113 may set, as the evaluation value, a distance d' from a straight line connecting sampling points at the minimum value and the maximum value (for example, 0 and 255 in the case of 8 bits) of the definition region of the input tone values.

In S703, the patch tone calculation unit 113 determines whether or not the set of interest has linearity based on the evaluation value obtained in S702. For example, in a case when the distance d is used as the evaluation value, the patch tone calculation unit 113 determines that the set of interest has linearity if d≤th is established, where th denotes a predetermined threshold (for example, th=0.02), and determines that the set of interest has no linearity if d>th is established. If the patch tone calculation unit 113 determines that the set of interest has linearity in S703, the processing proceeds to S705.

If the patch tone calculation unit 113 determines that the set of interest has no linearity in S703, the patch tone calculation unit 113 in S704 selects a midpoint of the input tone values i1 and i2 of the sampling points P1 and P2 and a midpoint of the input tone values i2 and i3 of the sampling points P2 and P3 as the selected tone values.

In S705, the patch tone calculation unit 113 determines whether all sets of sampling points have been processed as the set of interest. If the processing in S702 to S704 is completed with all the sets processed as the set of interest, this dynamic generation processing for the chart image is terminated.

If the processing is completed, the patch tone calculation unit 113 updates the set of three consecutive sampling points of interest in S706 and then returns to S702 to continue the processing.

Figure 8:
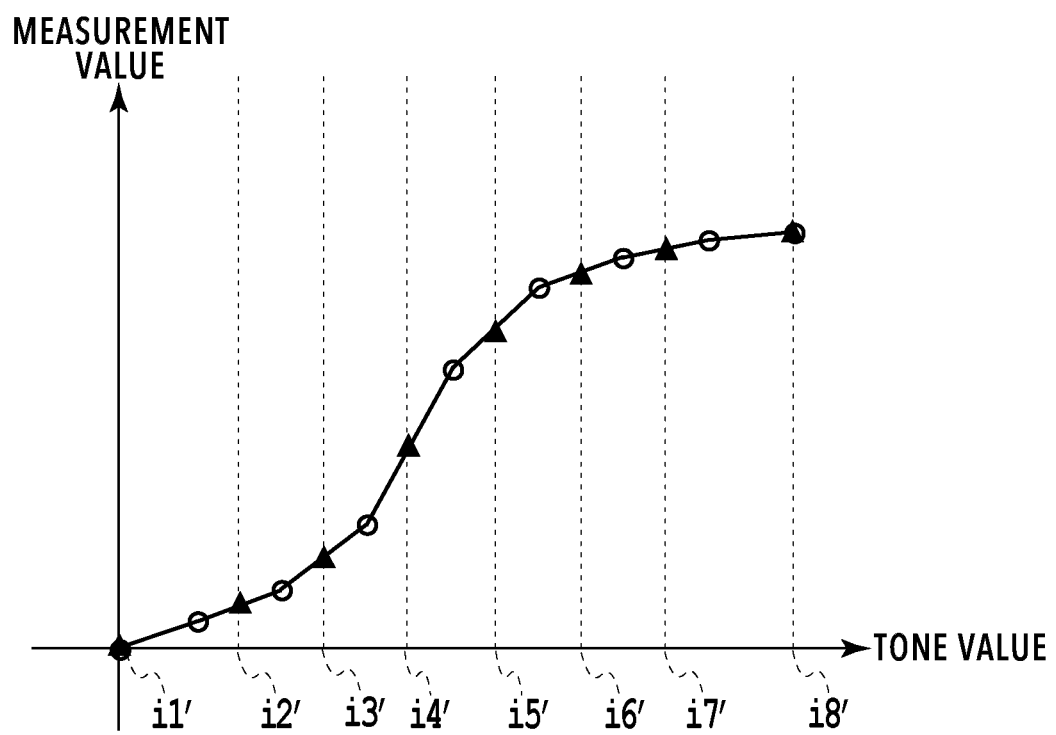
FIG. 8 is a diagram illustrating an example of selected tone values obtained by the tone value selection processing according to the first embodiment.

The chart image generation unit 112 generates the chart image by using final input tone values that include the multiple selected tone values obtained in S701 to S706 described above and additionally include the minimum value and the maximum value of the definition region of the initial tone values. FIG. 8 illustrates an example in which the selected tone values i1' to i8' are illustrated on the output characteristic obtained with the initial tone values used as the input tone values. In FIG. 8, the circles are the sampling points corresponding to the initial tone values and the triangles are points corresponding to the selected tone values on the output characteristic obtained with the initial tone values used as the input tone values.

<Method of Generating Chart Image>

For each of rectangular regions with a size of width W in the nozzle row direction and a height H in the sheet conveyance direction, the chart image generation unit 112 generates the tone value patch to which the initial tone value set as the corresponding input tone value or the selected tone value obtained in the aforementioned processing is uniformly allocated. The number of tone value patches generated is the same as the number of the input tone values. Therefore, in a case when there are, for example, eight input tone values as illustrated in FIG. 8, eight patches corresponding to the respective input tone values i1' to i8' are generated. In this regard, the input tone value i1' is "0". Thus, the density value for the input tone value i1' can be measured on a margin of the sheet. Accordingly, if a sufficiently large margin can be provided, generation of the tone value patch for the tone value zero, like the input tone value i1' may be omitted. Then, the chart image generation unit 112 generates the chart image for density measurement by arranging multiple tone value patches generated for the respective input tone values in the sheet conveyance direction.

Moreover, for example, for the inkjet printer using inks of four colors of C, M, Y, and K, four types of chart images different in color are generated. Note that, in a case when the number of input tone values is few and the number of tone value patches to be included in each chart image is equal to or less than a predetermined number, the chart images for multiple colors may be grouped into one piece of image data.

Grouping the chart images for multiple colors into one piece of image data printable on the minimum possible number of print media can reduce paper wasted due to output of the test charts for highly-accurate nonuniformity correction.

Although a new selected tone value is set if the evaluation value for evaluating the linearity exceeds the predetermined threshold th in the embodiment, the present invention is not limited to this configuration. For example, new selected tone values may be set for a region in which the input tone values of the sets of sampling points having the top n (n is an integer of 1 or more) evaluation values are present. In this case, one input tone value may be deleted by deleting one sampling point from the set of sampling points for which a new selected tone value is not set. Moreover, the number of new selected tone values is limited by adjusting n. This can facilitate the operation of grouping the chart images for multiple colors into one piece of image data and printing the image data on the minimum possible number of print media.

As described above, in the embodiment, it is possible to select more tone values as the input tone values in a range in which the linearity of the output characteristic generated based on the measurement results of the test chart is low, and generate the test chart that enables highly accurate interpolation.

Second Embodiment

Figure 9:
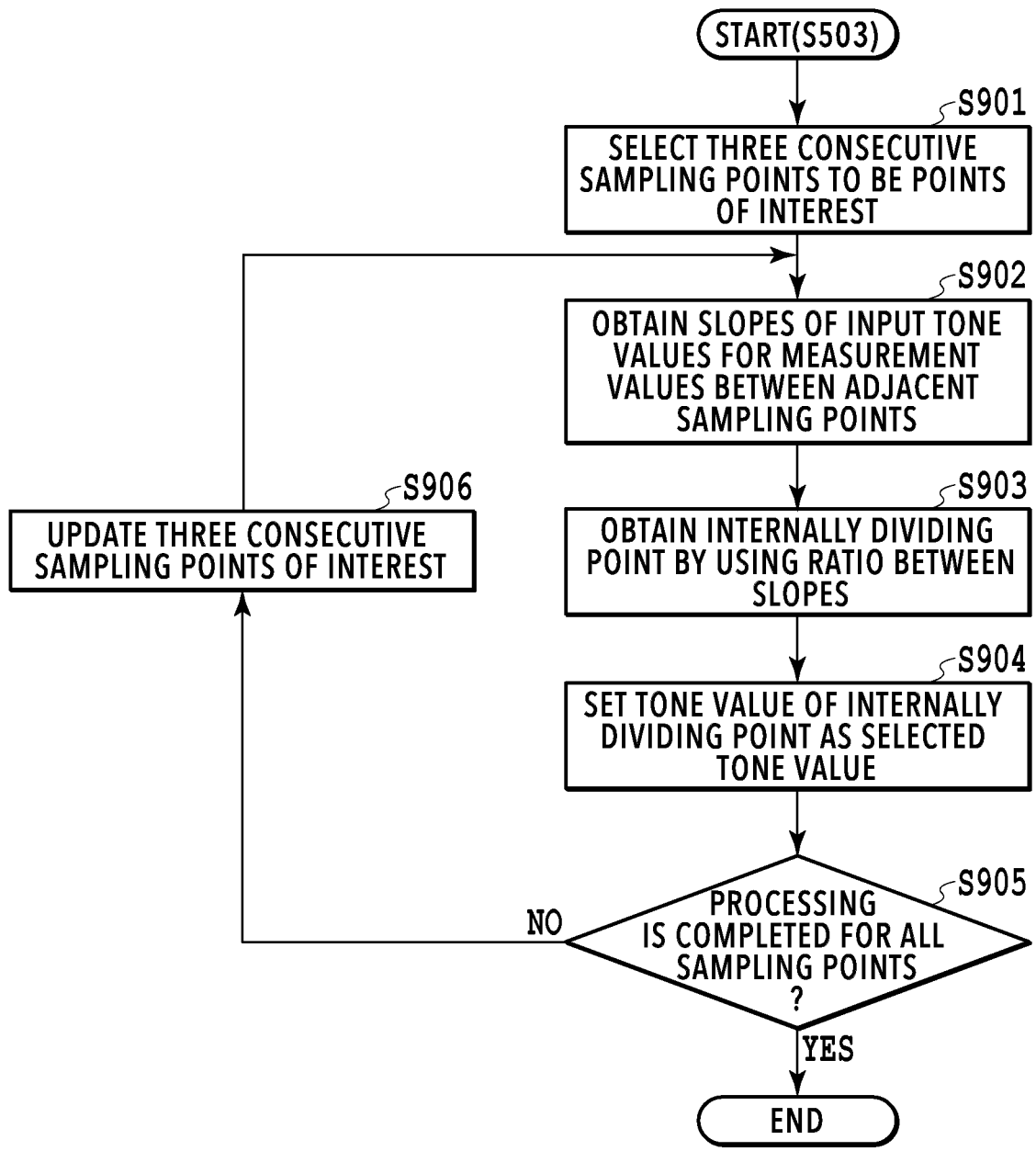
FIG. 9 is a flowchart illustrating a procedure of tone value selection processing according to a second embodiment.

In the aforementioned first embodiment, the midpoint of the input tone values of the three consecutive sampling points is selected as the selected tone value. However, in this method, an interval between each newly selected tone value and the corresponding existing input tone value is determined based on an interval between the initial tone values and is thus fixed. Accordingly, the distance between the selected tone value and the existing input tone value cannot be changed for each set of sampling points depending on the degree of linearity. In view of this, there is considered a method of determining the selected tone value for each set of sampling points depending on a ratio between slopes of line segments each connecting two adjacent sampling points. FIG. 9 illustrates a flowchart of tone value selection processing by the patch tone calculation unit 113 in the embodiment.

In S901, the patch tone calculation unit 113 selects one set of three consecutive sampling points. A method of selecting the sampling points in this step is the same as that in S701 of the first embodiment.

In S902, the patch tone calculation unit 113 obtains slopes of line segments one of which connects Pn−1 and Pn, and the other of which connects Pn and Pn+1 for the set of sampling points selected in S901.

Figure 10A:
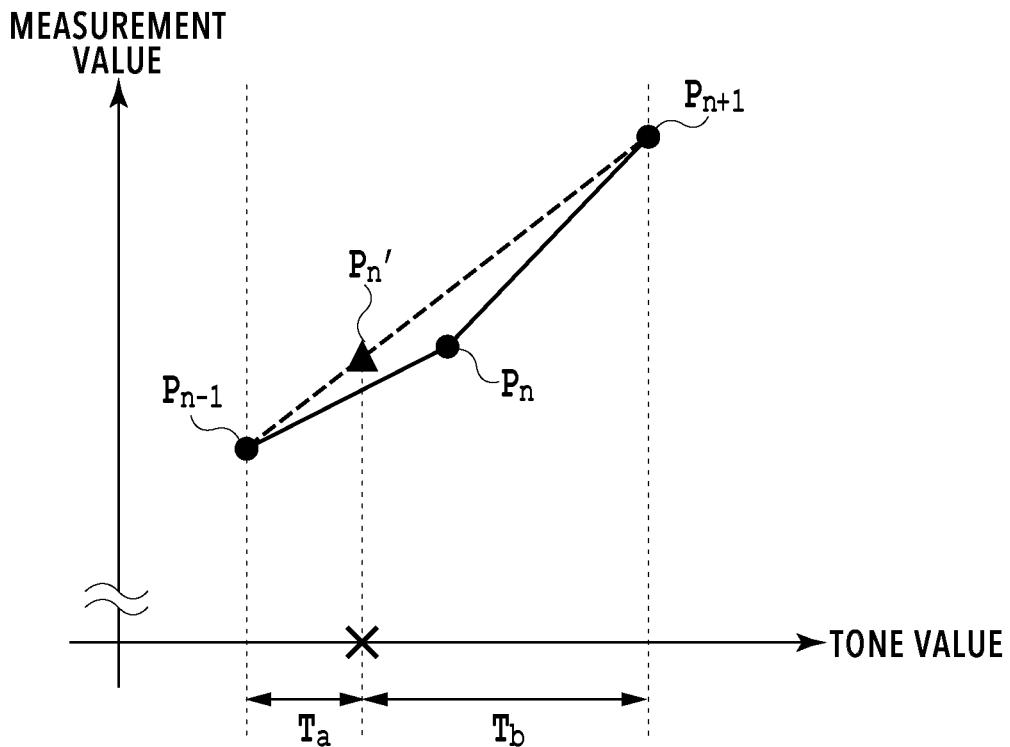
FIG. 10A is a diagram illustrating a method of obtaining an internally dividing point to determine a selected tone value in the tone value selection processing according to the second embodiment.
Figure 10B:
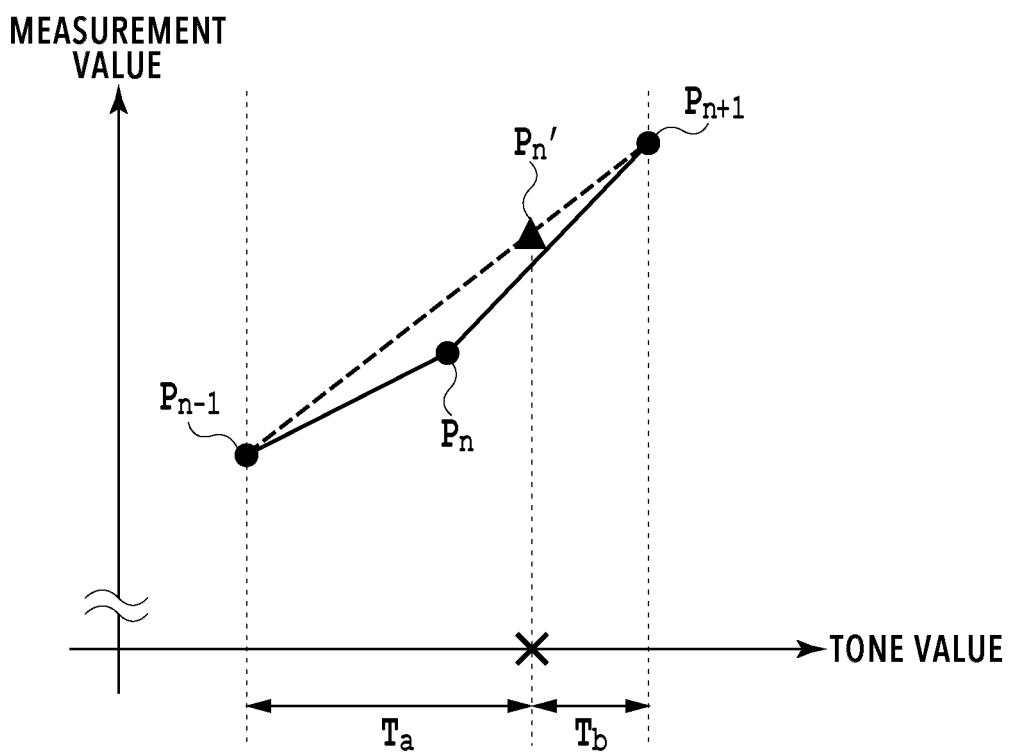
FIG. 10B is a diagram illustrating a method of obtaining an internally dividing point to determine a selected tone value in the tone value selection processing according to the second embodiment.

In S903, the patch tone calculation unit 113 obtains an internally dividing point Pn' of the two points Pn−1 and Pn+1 at both ends by using the obtained slopes. Conceivable methods of obtaining the internally dividing point Pn' are a method using a normal ratio between the slopes and a method using an inverse ratio between the slopes. The example illustrated in FIG. 10A is a diagram in a case when the normal ratio is used and the example illustrated in FIG. 10B is a diagram in a case when the inverse ratio is used. The triangular markers indicate the obtained internally dividing points Pn'. In the normal ratio, a ratio of a tone value difference Ta between Pn−1 and Pn' to a tone value difference Tb between Pn' and Pn+1 is equal to a ratio of the slope of the line segment connecting Pn−1 and Pn to the slope of the line segment connecting Pn and Pn+1. In the inverse ratio, the ratio of the tone value difference Ta between Pn−1 and Pn' to the tone value difference Tb between Pn' and Pn+1 is equal to a ratio of the slope of the line segment connecting Pn and Pn+1 to the slope of the line segment connecting Pn−1 and Pn. Accordingly, in a case when the internally dividing point Pn' is set based on the normal ratio, the internally dividing point Pn' is located between the two adjacent sampling points having the lesser slope. Meanwhile, in a case when the internally dividing point Pn' is set based on the inverse ratio, the internally dividing point Pn' is located between the two adjacent sampling points having the greater slope.

In this case, which one of the normal ratio and the inverse ratio is to be used may be determined in advance or selected depending on a state of slopes.

In S904, the patch tone calculation unit 113 obtains a tone value corresponding to the obtained internally dividing point and sets this tone value as the selected tone value. Note that, since measurement value information of the internally dividing point is unnecessary, the actual processing may be implemented such that the processes of S903 and S904 are collectively performed and the selected tone value is derived by obtaining the internally dividing point between the tone values of Pn−1 and Pn+1.

If the tone value selection is completed for all the sets of sampling points, this processing is terminated. If the tone value selection is not completed, the set of sampling points of interest is updated and the processing returns to S902, and is continued.

Figure 11A:
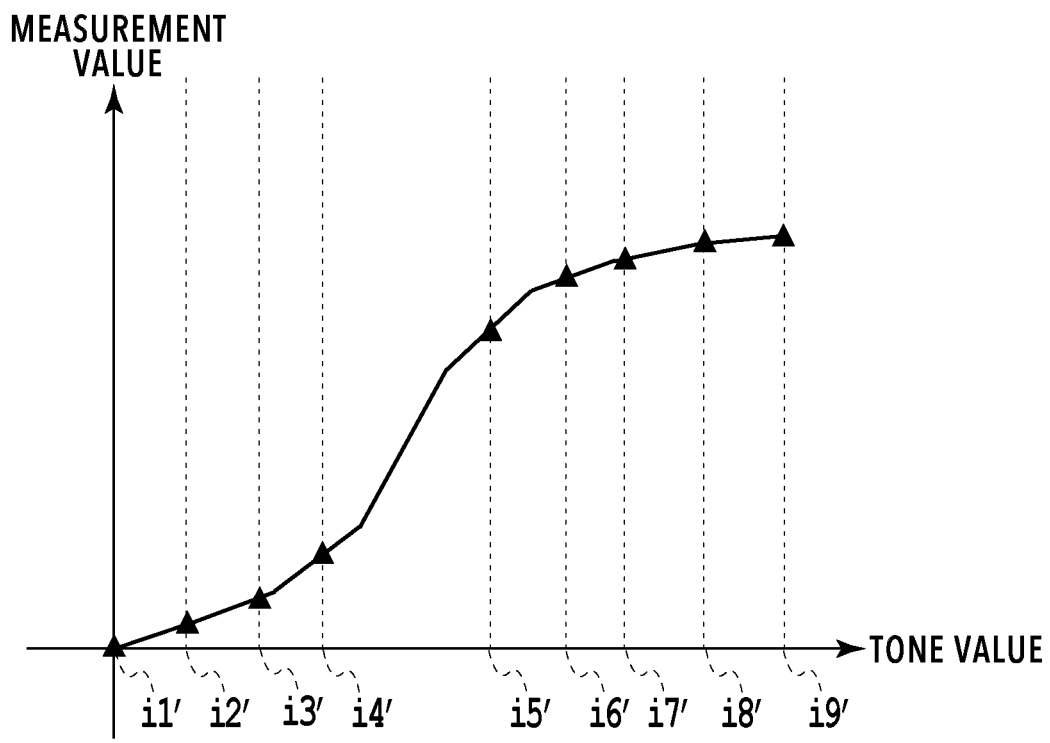
FIG. 11A is a diagram illustrating an example of selected tone values each obtained by using a normal ratio.
Figure 11B:
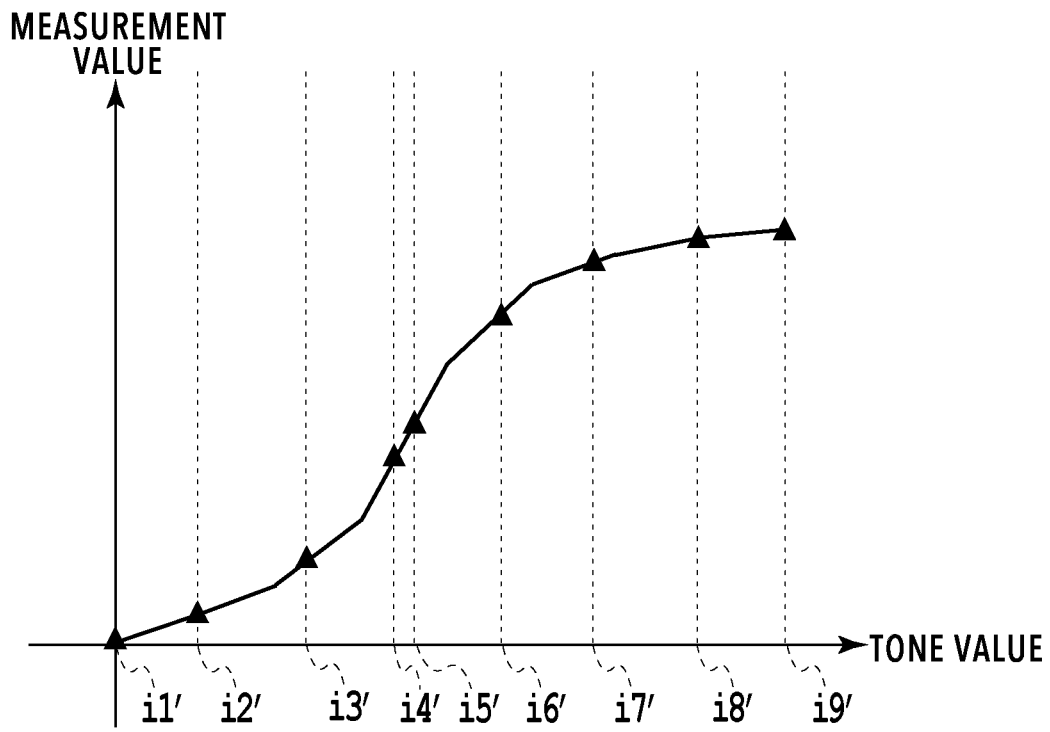
FIG. 11B is a diagram illustrating an example of selected tone values each obtained by using an inverse ratio.

FIGS. 11A and 11B illustrate examples of the selected tone values obtained from the output characteristic by performing the aforementioned processing. FIG. 11A is an example in a case when the internally dividing points are each obtained by using the normal ratio and FIG. 11B is an example in a case when the internally dividing points are each obtained by using the inverse ratio. New input tone values i1' to i9' are the selected tone values obtained.

As described above, in the embodiment, changing the intervals between the input tone values depending on the slopes of the output characteristic generated based on the measurement results of the test chart enables generation of the test chart in which highly-accurate interpolation is achieved by setting more input tone values in a range with low linearity.

Third Embodiment

Figure 12:
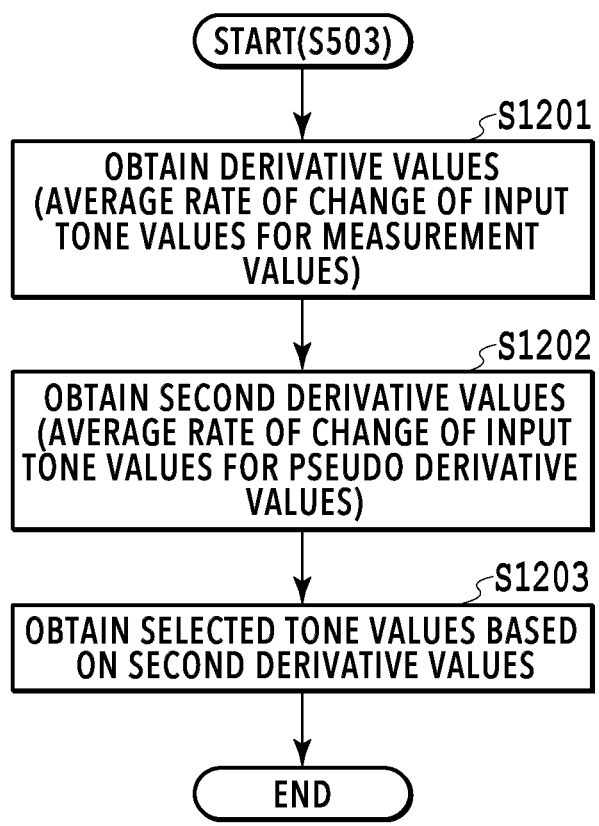
FIG. 12 is a flowchart illustrating a procedure of tone value selection processing according to a third embodiment.

In the first and second embodiments, the tone values are dynamically selected based on the linearity and the slopes of the three consecutive sampling points. Meanwhile, the linearity of the set of sampling points can be also calculated from a second derivative value of the output characteristic. Accordingly, in the embodiment, the selected tone values are calculated based on the second derivative value of the output characteristic obtained in S502. The image processing apparatus 1 obtains the second derivative value and determines that the linearity is low in a range in which the second derivative value is great and that the linearity is high in a range in which the second derivative value is small. FIG. 12 illustrates a flowchart of the tone selection processing by the patch tone calculation unit 113 in the embodiment.

In S1201, the patch tone calculation unit 113 calculates derivative values in the output characteristic indicating the measurement values for the input tone values. In this case, since the output characteristic obtained in the embodiment is composed of discrete values, an average rate of change between each pair of adjacent sampling points is treated as the derivative value. Moreover, a tone value corresponding to each derivative value is set as a tone value at a midpoint between the two adjacent sampling points.

Figure 13A:
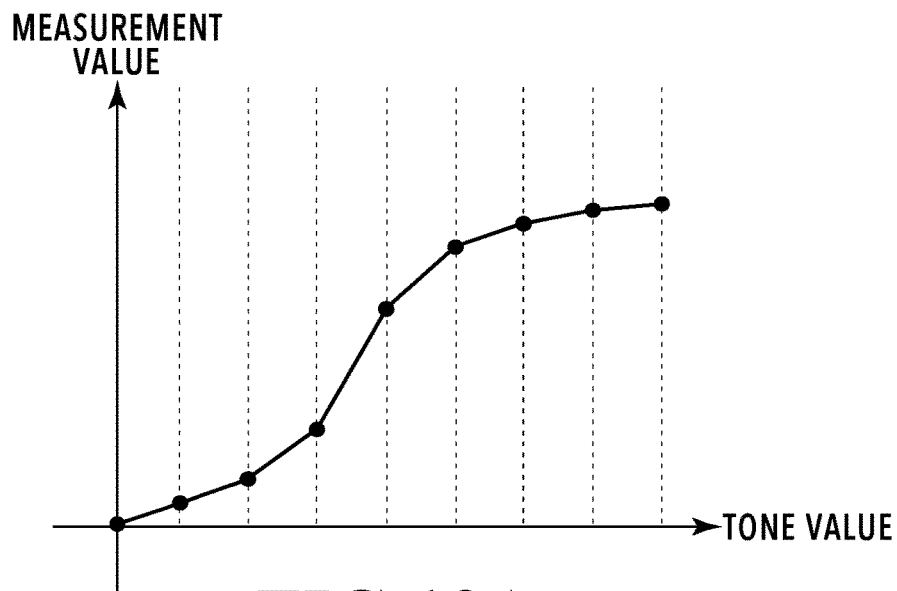
FIG. 13A is a graph illustrating an example of the output characteristic that expresses measurement values for input tone values.
Figure 13B:
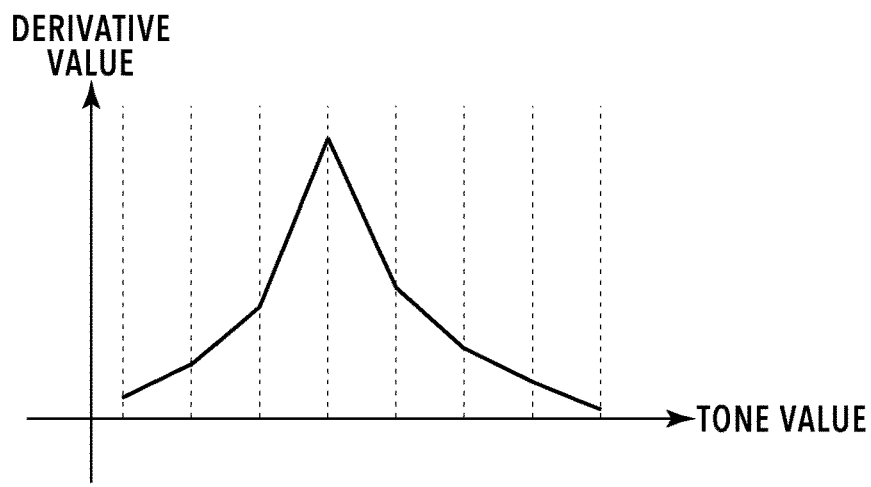
FIG. 13B is a graph of input tone value-derivative value.
Figure 13C:
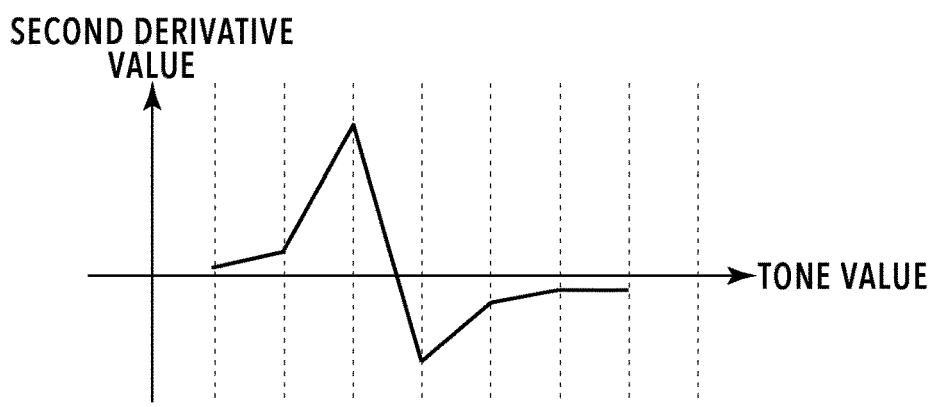
FIG. 13C is a graph expressing second derivative values for the input tone values.

In S1202, the patch tone calculation unit 113 calculates second derivative values in a graph expressing the derivative values for the input tone values obtained in S1201 by obtaining an average rate of change between each pair of adjacent sampling points in the same manner as in S1201. FIG. 13A is a graph expressing an example of the output characteristic that is obtained in S502 and that expresses the measurement values for the input tone values, FIG. 13B is a graph expressing the derivative values for the input tone values, and FIG. 13C is a graph expressing the second derivative values for the input tone values. As illustrated in FIGS. 13A and 13C, a range in which the second derivative values are great corresponds to a range in which the linearity of the output characteristic is low and a range in which the second derivative values are small corresponds to a range in which the linearity of the output characteristic is high.

Figure 14A:
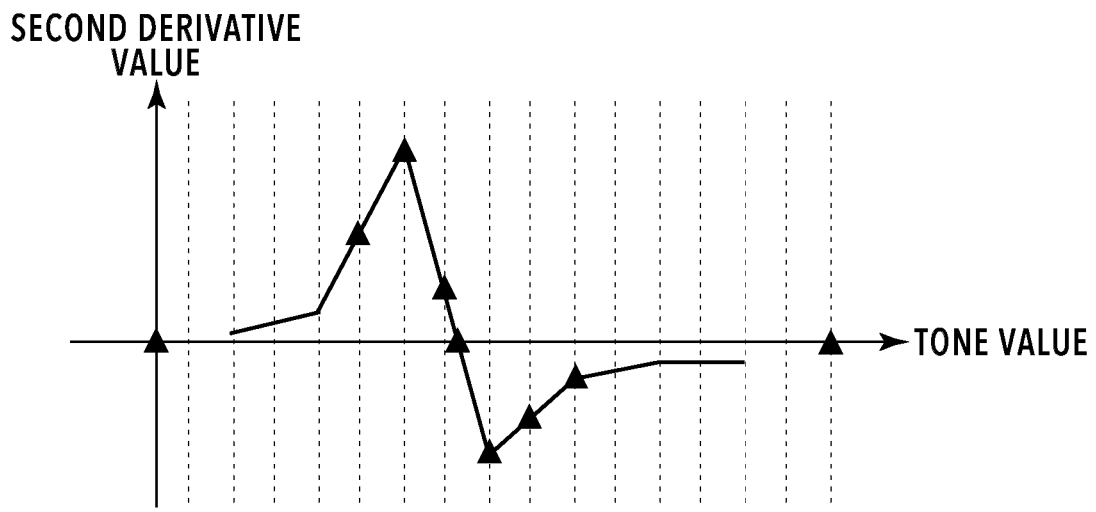
FIG. 14A is a diagram illustrating the output characteristic and derivative values of the output characteristic.
Figure 14B:
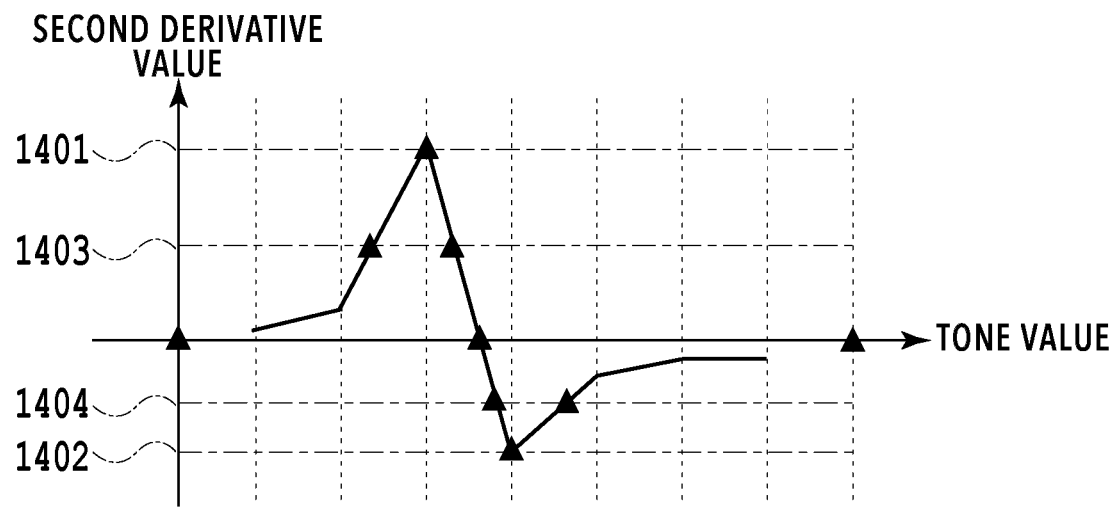
FIG. 14B is a diagram illustrating the output characteristic and second derivative values of the output characteristic.

In S1203, the patch tone calculation unit 113 calculates the selected tone values based on the second derivative values obtained in S1202. A specific example of the selection method is described by using FIGS. 14A and 14B. In the method illustrated in FIG. 14A, from the tone values obtained by evenly dividing the definition region (for example, 0 to 255 in the case of 8 bits) of the input tone values, tone values are selected in descending order of the absolute value of the corresponding second derivative value. In the example illustrated in FIG. 14B, tone values are selected at which the second derivative value takes the maximum value 1401 and the minimum value 1402 and at which the second derivative value takes target values 1403 and 1404 that are a value half of the maximum value 1401 and a value half of the minimum value 1402. Although two target values with respect to the extremal values of the second derivative value are selected in this example, the number and the values of the target values may be set as appropriate depending on the number of tone values desired to be selected.

Moreover, in either method, it is preferable that the generation of the chart image use final input tone values including the selected multiple tone values and additionally including the maximum value and the minimum value (0 and 255 in the case of 8 bits) of the definition region of the input tone values and the tone value at which the second derivative value is zero.

As described above, in the embodiment, it is possible to generate the test chart that enables highly accurate interpolation by selecting more tone values as the input tone values in the range in which the linearity of the output characteristic generated based on the measurement result of the test chart is low.

Fourth Embodiment

In the aforementioned second embodiment, the method of obtaining the internally dividing point from the ratio between the slopes of the output characteristic and determining the selected tone value is described. FIG. 11A illustrates the example in which all the internally dividing points are obtained by using the normal ratio, and FIG. 11B illustrates the example in which all the internally dividing points are obtained by using the inverse ratio. In this section, a description is given of a method of selecting which one of the normal ratio and the inverse ratio to use to obtain the internally dividing point for each range based on the second derivative values obtained in the third embodiment.

First, the second derivative values of the output characteristic are obtained in the same procedure as in S1201 and S1202 in the third embodiment. In this case, the second derivative value at an end point of the definition region of the input tone values is assumed to be zero. Note that tone values at which the second derivative values are obtained herein are the same as the tone values for the sampling points.

Figure 15A:
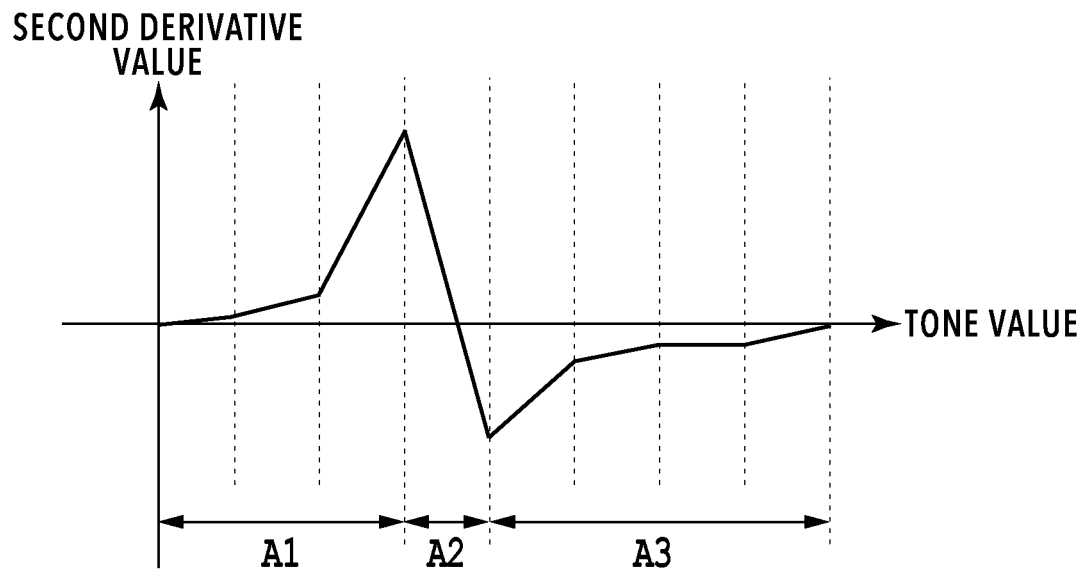
FIG. 15A is a diagram illustrating a tone value selection example according to the third embodiment.
Figure 15B:
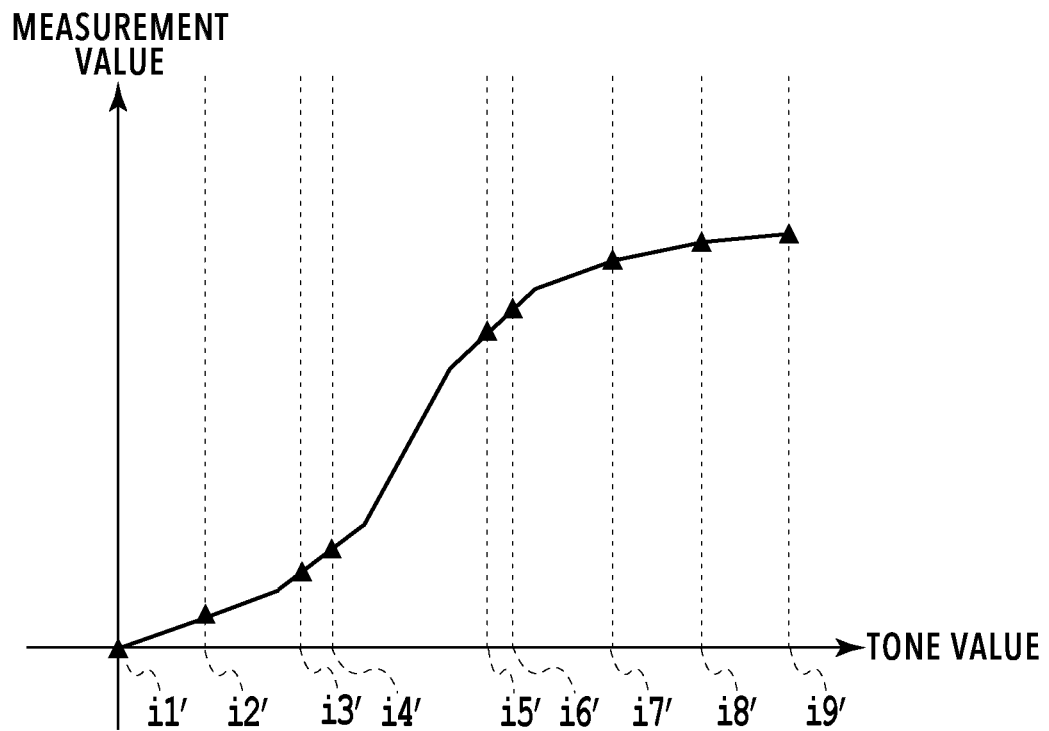
FIG. 15B is a diagram illustrating a tone value selection example according to the third embodiment.

Next, which one of the normal ratio and the inverse ratio to use to calculate the internally dividing point is determined for each range based on the graph of the obtained second derivative values. FIG. 15A is a graph illustrating an example of the obtained second derivative values. The internally dividing point is obtained by using the inverse ratio in the ranges A1 and A3 in which the second derivative value increases monotonically and is obtained by using the normal ratio in the range A2 in which the second derivative value decreases monotonically, and the tone values corresponding to the obtained internally dividing points are set as the selected tone values. FIG. 15B is a graph illustrating an example in which selected tone values selected based on the internally dividing points obtained in the aforementioned method are set as the input tone values i1' to i9'.

Other Embodiments

Although the aforementioned embodiments relate to the example in which printing is performed by using the ink of one color or the inks of four colors of K, C, M, and Y, the present invention is not limited this example. For example, the present invention can be similarly applied to modes in which printing is performed by using low-density inks such as light cyan, light magenta, and gray, or inks of particular colors such as red, green, blue, orange, and violet to obtain the aforementioned effects.

Moreover, the inkjet image forming apparatus is used in the aforementioned embodiments. Instead, in the case of using an electrophotographic image forming apparatus, the aforementioned processing performed for each nozzle only needs to be performed as many times as the number of color materials to be used.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

According to the present disclosure, highly-accurate density nonuniformity correction can be performed while saving the number of patches.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image processing apparatus comprising:
a generation unit that generates a first chart image in which a plurality of patches with different tone values are arranged;
an obtaining unit that obtains measurement values acquired by measuring a test chart created by forming the first chart image on a print medium with an image forming apparatus, the measurement values indicating densities of a color material in regions of the test chart corresponding to the respective patches; and a selection unit that selects at least one tone value in a range in which an output characteristic of the image forming apparatus derived based on the tone values of the respective patches and the measurement values satisfies a predetermined condition, wherein the generation unit generates a second chart image in which a patch corresponding to the selected at least one tone value is included and at least one patch corresponding to the tone value outside the range in which the output characteristic satisfies the predetermined condition is omitted among the plurality of patches.

2. The image processing apparatus according to claim 1, further comprising:

a calculation unit that calculates a correction value for correcting density nonuniformity based on the measurement values; and a correction unit that corrects image data to be inputted into the image forming apparatus based on the correction value.

3. The image processing apparatus according to claim 1, wherein the range in which the output characteristic satisfies the predetermined condition is a range in which a non-linearity evaluation value is greater than a predetermined value.

4. The image processing apparatus according to claim 3, wherein the non-linearity evaluation value is a distance determined based on three consecutive sampling points among sampling points determined by the tone values of the respective patches and the measurement values, the distance being a distance between a line segment connecting the two sampling points at both ends of the three consecutive sampling points and the sampling point at the middle of the three consecutive sampling points.

5. The image processing apparatus according to claim 4, wherein, in a case when there are a plurality of tone values in the range in which the output characteristic satisfies the predetermined condition, the selection unit selects, from the plurality of tone values, a predetermined number of tone values in descending order of the non-linearity evaluation value at the corresponding sampling point.

6. The image processing apparatus according to claim 1, wherein the selected tone value has an equal tone difference from two tone values adjacent to the selected tone value, the two adjacent tone values corresponding to the patches included in the first chart.

7. The image processing apparatus according to claim 1, wherein, for three consecutive sampling points among sampling points determined by the tone values of the respective patches and the measurement values, the selection unit calculates a ratio between slopes, each being between two adjacent sampling points in the three consecutive sampling points and selects a tone value corresponding to an internally dividing point, set based on the calculated ratio between the slopes, between the two sampling points at both ends of the three consecutive sampling points.

8. The image processing apparatus according to claim 7, wherein the ratio between the slopes is one of a normal ratio formulated as the ratio between the slopes based on which the internally dividing point is set between the two adjacent sampling points having the smaller slope and an inverse ratio formulated as the ratio between the slopes based on which the internally dividing point is set between the two adjacent sampling points having the greater slope.

9. The image processing apparatus according to claim 1, wherein, for three consecutive sampling points among sampling points determined by the tone values of the respective patches and the measurement values, the selection unit calculates second derivative values, each being between two adjacent sampling points in the three consecutive sampling points, and selects a tone value based on the second derivative values.

10. The image processing apparatus according to claim 9, wherein the selection unit calculates a ratio between the second derivative values between the two adjacent sampling points in three consecutive sampling points, and selects a tone value corresponding to an internally dividing point, set based on the calculated ratio between the second derivative values, between the sampling points at both ends of the three consecutive sampling points.

11. The image processing apparatus according to claim 10, wherein the ratio between the second derivative values is one of a normal ratio formulated as the ratio between the second derivative values based on which the internally dividing point is set between the two adjacent sampling points having the smaller second derivative value and an inverse ratio formulated as the ratio between the second derivative values based on which the internally dividing point is set between the two adjacent sampling points having the greater second derivative value.

12. The image processing apparatus according to claim 9, wherein the selection unit selects tone values corresponding to extremal values of the second derivative values and a target value determined with respect to the extremal values.

13. The image processing apparatus according to claim 1, wherein, in a case when the number of patches included in each chart image is equal to or less than a predetermined number, the generation unit generates one chart image including the chart images of different colors.

14. An image processing method comprising the steps of:

generating a first chart image in which a plurality of patches with different tone values are arranged;

obtaining measurement values acquired by measuring a test chart created by forming the first chart image on a print medium with an image forming apparatus, the measurement values indicating densities of a color material in regions of the test chart corresponding to the respective patches;

selecting at least one tone value in a range in which an output characteristic of the image forming apparatus derived based on the tone values of the respective patches and the measurement values satisfies a predetermined condition; and generating a second chart image in which a patch corresponding to the selected at least one tone value is included and at least one patch corresponding to the tone value outside the range in which the output characteristic satisfies the predetermined condition is omitted among the plurality of patches.

15. A non-transitory computer readable storage medium storing a program that causes a computer to execute an image processing method comprising the steps of:

generating a first chart image in which a plurality of patches with different tone values are arranged;

obtaining measurement values acquired by performing measurement on a test chart created by forming the first chart image on a print medium with an image forming apparatus, the measurement values indicating densities of a color material in regions of the test chart corresponding to the respective patches;

selecting at least one tone value in a range in which an output characteristic of the image forming apparatus derived based on the tone values of the respective patches and the measurement values satisfies a predetermined condition; and generating a second chart image in which a patch corresponding to the selected at least one tone value is included and at least one patch corresponding to the tone value outside the range in which the output characteristic satisfies the predetermined condition is omitted among the plurality of patches.

\* \* \* \* \*